T. A. & J. B. CONNOLLY.
INTERNAL COMBUSTION ENGINE.
APPLICATION FILED OCT. 4, 1917.
1,253,004.
Patented Jan. 8, 1918.
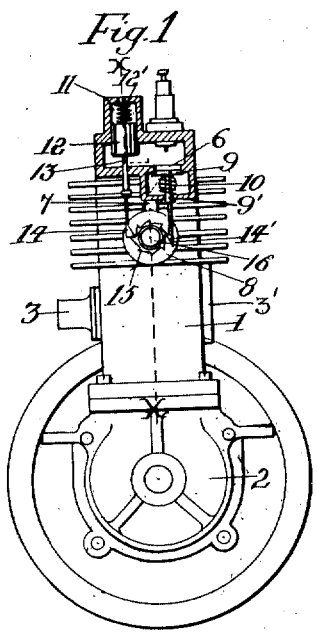
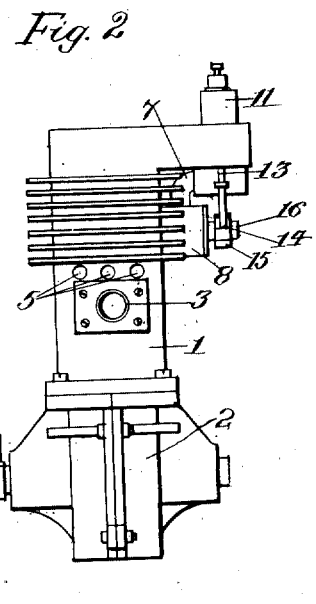
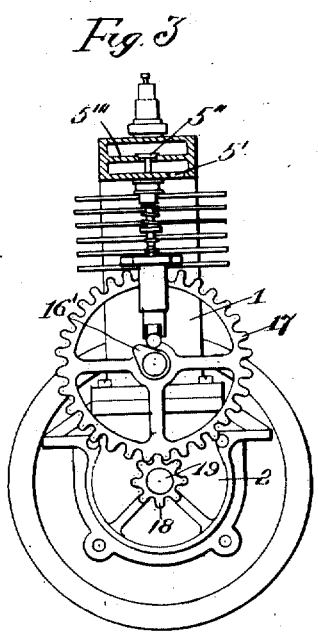
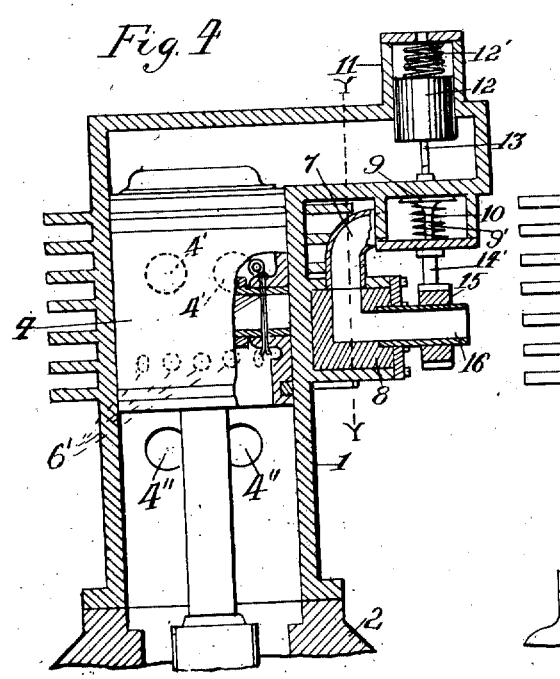
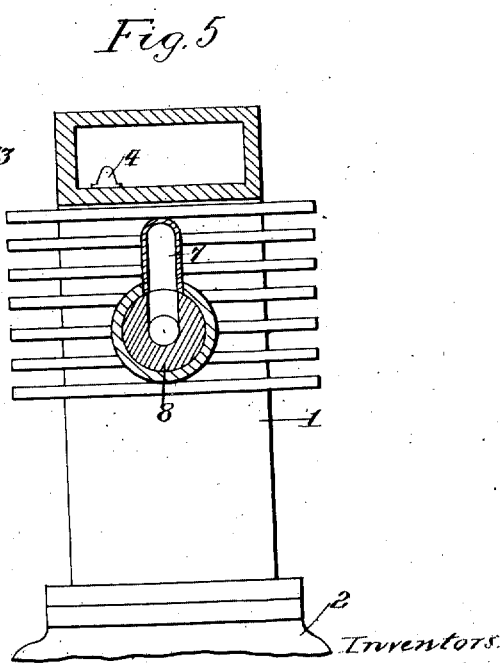
Inventors.
Thomas A. Connolly
Joseph B. Connolly

UNITED STATES PATENT OFFICE.

THOMAS A. CONNOLLY AND JOSEPH B. CONNOLLY, OF WASHINGTON, DISTRICT OF COLUMBIA.

INTERNAL-COMBUSTION ENGINE.

1,253,004.  Specification of Letters Patent.  Patented Jan. 8, 1918.

Application filed October 4, 1917. Serial No. 194,705.

*To all whom it may concern:*

Be it known that we, THOMAS A. CONNOLLY and JOSEPH B. CONNOLLY, citizens of the United States, residing at Washington, in the District of Columbia, have invented certain new and useful Improvements in Internal-Combustion Engines, of which the following is a specification, reference being had therein to the accompanying drawing.

This invention has relation to internal combustion engines and has for its object the provision of novel means for scouring or scavenging the cylinder.

Our invention is primarily an improvement on engines of the two cycle type. As at present constructed, engines of the two cycle type are adapted to take in gas and exhaust an exploded charge simultaneously and under such conditions that the fresh and exploded charge commingle thus reducing the purity of the charge and contaminating the same with non-explosive products of combustion. This contamination gradually increases during the operation of the engine and tends eventually to increase impurity in the mixture from a negligible to a serious degree and reduces the explosive character of the charge to such an extent as to greatly lessen the efficiency of the stroke of the piston and frequently to prevent explosion and stroke altogether.

Our invention aims at and secures in two cycle engines a complete scavenging of the cylinders at such intervals as will effectually prevent undue clogging and deterioration of the contents of the cylinder and thus does away with the principal objection to two cycle engines.

In the accompanying drawing, Figure 1 is an end elevation, partly in section, of an engine embodying our invention.

Fig. 2 is a side elevation of the same.

Fig. 3 is an end elevation of a modified form.

Fig. 4 is a vertical, sectional view on line X—X Fig. 1 and on an enlarged scale.

Fig. 5 is a sectional view on line Y—Y Fig. 4.

In carrying our invention into effect we adopt as a model for the application of our improvement a two cycle engine of any well known type having a cylinder 1, with crank case 2, with which communicates the inlet 3, from the carbureter and in which the fresh charge is compressed by the outstroke of the piston 4, and forced through the piston 4, which is of plunger type, and through the ports 4' 4' in the sides of the piston and the ports 4'' 4'', in the wall of the cylinder which at the extreme outward position of the piston register with the ports 4' 4' in the piston and thence under a recessed plate 3' fixed on the cylinder opposite the inlet 3 and thence into the cylinder 1 through the row of ports 6' in the cylinder wall, to be further compressed for firing. The exhaust passages 5, in such engine are so located that exhaust begins on the outstroke of the piston and during the period of intake from the crank case to the cylinder and continues until the piston makes part of its instroke.

To cause a thorough scavenging of the cylinder we provide the latter with a separate and supplementary exhaust port 6, and passage 7 leading to a rotary valve 8, and provide a puppet valve 9, therein, which is normally closed by a spring 10, and provide the cylinder at its end with a recess 11, and with a reciprocating plunger 12, the rod 13, of which carries a dog 14, to engage with the teeth of a ratchet wheel 15 secured to the spindle 16 of the rotary valve 8, and so arrange the connections of plunger 12, that at each compression instroke of the piston the plunger will be forced outward by pressure and caused to engage with a tooth of the ratchet wheel 15, and on its return stroke, impelled by spring 12', will turn the ratchet wheel and with it the rotary valve 8, a distance corresponding to the number of teeth of the ratchet. The stem 9' of the puppet valve 9 which will be depressed when the plunger 12, is forced outward also carries a dog 14' engaging with the teeth of the ratchet wheel 15 so that when the valve 9 rises after completion of a supplementary exhaust stroke of the piston as hereinafter described it will turn the ratchet wheel the distance of one tooth.

Assuming the engine to be running and operating as an ordinary two cycle engine, it will be seen that at the expiration of every power stroke of the piston, the rotary valve 8 will be turned by the inward movement of the plunger 12 and that once in every complete revolution it will present an open port to the exhaust port in the cylinder, and cause the ensuing instroke of the piston to operate the puppet valve 9 without moving plunger 12 and exhaust through the rotary valve. Upon completion of the exhaust and consequent reduction of pressure in the cylinder the puppet valve 9 is forced against its seat by its spring 10, thereby turning the ratchet wheel and with it the rotary valve to closed port, thus restoring conditions so that the engine will operate as an ordinary two cycle engine until the next period of complete exhaust arrives.

Instead of depending on the conditions of internal cylinder pressure to operate the exhaust devices, the more positive means illustrated in Fig. 3 may be employed. In this plan the ratchet and rotary valve are dispensed with, and the supplementary exhaust port 5' and puppet valve 5", so located and arranged that the latter, having its seat in partition 5''' will be opened by a cam 16', arranged to press against the stem of the valve and carried by the shaft of a gear wheel, 17, meshing with a pinion 18 on the power shaft 19 so that after a certain number of complete revolutions of the latter, corresponding to strokes of the piston, the cam will strike the valve rod and open the valve thus allowing the complete exhaust to take place. As soon as the cam 16' passes the valve rod, the valve will close by spring pressure.

What we claim is:—

1. The combination with the cylinder and piston of an internal combustion engine having an exhaust passage leading therefrom, of a supplementary exhaust port leading from the cylinder, an exhaust valve and operative mechanism associated therewith and arranged and adapted to open the supplementary exhaust port at periodic intervals following a plurality of power strokes of the piston.

2. The combination with the cylinder and piston of an internal combustion engine having an inlet for gas and an exhaust passage, of a supplementary exhaust passage, an exhaust valve in said passage and mechanism for opening said exhaust valve after a plurality of power strokes of the piston.

3. The combination with the cylinder and piston of an internal combustion engine having a valveless exhaust passage, opened and closed by the piston, of a supplementary exhaust and means for opening the latter and further exhausting the cylinder at intervals between series of two cycle operations.

In testimony whereof we affix our signatures in presence of two witnesses.

THOMAS A. CONNOLLY.
JOSEPH B. CONNOLLY.

Witnesses:
 IRA P. HINES,
 BENNETT S. JONES.